(12) United States Patent
Evans et al.

(10) Patent No.: US 11,092,809 B2
(45) Date of Patent: Aug. 17, 2021

(54) DISPLAY SYSTEM WITH OPTICAL MODULE HAVING PRESSURE-RELIEVING FEATURE

(71) Applicant: Apple Inc., Cupertino, CA (US)

(72) Inventors: Neal D. Evans, Sunnyvale, CA (US); Anthony S. Montevirgen, Milpitas, CA (US); James W. VanDyke, Menlo Park, CA (US); Christopher Wilk, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 46 days.

(21) Appl. No.: 16/144,297

(22) Filed: Sep. 27, 2018

(65) Prior Publication Data

US 2019/0339523 A1 Nov. 7, 2019

Related U.S. Application Data

(60) Provisional application No. 62/666,254, filed on May 3, 2018.

(51) Int. Cl.
  *G02B 27/01* (2006.01)
  *G02B 27/00* (2006.01)
  (Continued)

(52) U.S. Cl.
  CPC ..... *G02B 27/0172* (2013.01); *G02B 27/0093* (2013.01); *G02B 27/0955* (2013.01); *G06F 3/013* (2013.01)

(58) Field of Classification Search
  CPC ............ G02B 27/0093; G02B 27/0176; G02B 27/0172; G02B 27/017; G02B 2027/0127;
  (Continued)

(56) References Cited

U.S. PATENT DOCUMENTS 5,497,290 A    3/1996   Fukui et al.
5,966,746 A * 10/1999   Reedy ..................... A61F 9/028
                                                   2/171.3
(Continued)

FOREIGN PATENT DOCUMENTS

CN        1637455 A     7/2005
CN     101840068 A     9/2010
(Continued)

OTHER PUBLICATIONS

International Search Report and Written Opinion issued in co-pending International Application No. PCT/US2018/053117, dated Jan. 10, 2019 (39 pp).

*Primary Examiner* — Muhammad N Edun
(74) *Attorney, Agent, or Firm* — Young Basile Hanlon & MacFarlane, P.C.

(57) ABSTRACT

An optical module for a display system includes a lens, a display screen, a movement mechanism, and one or more pressure-relieving features. The display screen cooperatively defines a chamber with the lens. The lens and the display screen are moved relative to each other by the movement mechanism. The one or more pressure-relieving features are in fluid communication with the chamber to hinder pressure in the chamber as the lens and the display are moved relative to each other.

26 Claims, 5 Drawing Sheets

(51) Int. Cl.
*G02B 27/09* (2006.01)
*G06F 3/01* (2006.01)

(58) Field of Classification Search
CPC . G02B 27/0179; G02B 27/0955; G06F 3/013; B01D 2253/102; B01D 53/04; B01D 2253/108; B01D 2258/06
See application file for complete search history.

(56) References Cited

U.S. PATENT DOCUMENTS

| | | |
|---|---|---|
| 2009/0303376 A1 | 12/2009 | Guo |
| 2010/0124032 A1 | 5/2010 | Levine |
| 2015/0138645 A1* | 5/2015 | Yoo .................... G02B 27/0101 359/630 |
| 2016/0320612 A1 | 11/2016 | Zhang |
| 2016/0345090 A1 | 11/2016 | Wilk et al. |
| 2017/0064438 A1 | 3/2017 | Wilk et al. |
| 2017/0168303 A1* | 6/2017 | Petrov ................ G02B 27/0176 |
| 2017/0180688 A1 | 6/2017 | Otsubo et al. |
| 2017/0255019 A1 | 9/2017 | Lyons |
| 2017/0358136 A1 | 12/2017 | Gollier et al. |
| 2019/0154952 A1* | 5/2019 | Zheng ..................... G02B 7/12 |

FOREIGN PATENT DOCUMENTS

| | | |
|---|---|---|
| CN | 104317054 A | 1/2015 |
| CN | 204331156 U | 5/2015 |
| CN | 105068648 A | 11/2015 |
| CN | 105163543 A | 12/2015 |
| CN | 204883054 U | 12/2015 |
| CN | 105246284 A | 1/2016 |
| CN | 105425397 A | 3/2016 |
| CN | 205826961 U | 12/2016 |
| CN | 107479193 A | 12/2017 |
| DE | 4217837 A1 | 12/1992 |
| EP | 0961534 A1 | 12/1999 |
| EP | 3190808 A1 | 7/2017 |
| JP | S63256133 A | 10/1988 |
| JP | 2018060880 A | 4/2018 |
| WO | 2018056473 A1 | 3/2018 |

* cited by examiner

DISPLAY SYSTEM WITH OPTICAL MODULE HAVING PRESSURE-RELIEVING FEATURE

CROSS-REFERENCE TO RELATED APPLICATION(S)

This application claims priority to and the benefit of U.S. Provisional Patent Application No. 62/666,254, filed May 3, 2018, the entire disclosure of which is incorporated by reference herein.

TECHNICAL FIELD

This disclosure relates to display systems and, in particular, optical modules therefor.

BACKGROUND

Display systems may include a head-mounted display unit (HMD). The head-mounted display may include one or more displays (e.g., screens) that display digital images to a user wearing the head-mounted display and one or more corresponding lenses through which the user views the digital images. The digital images may include a scene having both a foreground and a background features, such as a person in the foreground and a landmark in the background. To simulate changing focal distances as the user looks between the foreground and the background features of the digital image, a distance may be changed between the one or more displays and the one or more lenses corresponding thereto.

SUMMARY

Disclosed herein are implementations of an optical module and head-mounted displays having the optical module.

In one aspect, an optical module for a display system includes a lens, a display screen, a movement mechanism, and one or more pressure-relieving features. The display screen cooperatively defines a chamber with the lens. The lens and the display screen are moved relative to each other by the movement mechanism. The one or more pressure-relieving features is in fluid communication with the chamber to hinder pressure changes in the chamber as the lens and the display are moved relative to each other.

The one or more pressure-relieving features may retain air inside the chamber. The one or more pressure-relieving features may passively hinder pressure changes in the chamber. The one or more pressure-relieving features may include an adsorbent. The one or more press-relieving features may include a passive radiator.

In another aspect, a head-mounted display includes a housing, a support, a sensor, and an optical module. The support is coupled to the housing for supporting the housing on a head of a user. The sensor measures a parameter of an eye of the user. The optical module includes a lens, a display screen, a movement mechanism, and one or more of an adsorbent material or a passive radiator. The display screen cooperatively defines a chamber with the lens. The lens and the display screen are moved relative to each other by the movement mechanism according to the parameter. The one or more of the adsorbent material of the passive radiator are in fluid communication with the chamber to hinder changes of pressure in the chamber as the lens and the display are moved relative to each other.

In another aspect, an optical module for a head-mounted display includes a lens, a display, and passive pressure-relieving feature. The lens and the display cooperatively define a chamber. The one of the zeolite or the flexible membrane passively relieve air pressure on the display. The passive pressure-relieving feature hinders pressure changes in the chamber.

The Passive pressure-relieving feature may adsorb air as the chamber decreases in size, and may be zeolite. The passive pressure-relieving feature may expand as the chamber decreases in size, and may be a passive radiator.

DETAILED DESCRIPTION

Disclosed herein are embodiments of head-mounted displays (HMD) and display units thereof for use in displays systems, such as those used for computer-generated reality (e.g., virtual reality or mixed reality), as described below. The display unit includes a display, a lens, and a movement mechanism that moves the display and the lens relative to each other. Each display unit further includes a chamber that is defined between the display and the lens. The chamber is sealed to prevent or hinder intrusion of debris (e.g., dust, moisture droplets, etc.) from entering the chamber and, thereby, interfering with the user's view of digital images on the display. As the display and the lens move relative to each other, the volume of the chamber changes, such that pressure within the chamber changes. Such changes in volume and pressure are accounted for by one or more of vents, materials, or mechanisms in communication with the chamber, which relieve (e.g., hinder) pressure changes and, thereby, may allow for a less powerful movement mechanism and, thereby, lighter and/or more compact display units. This may also reduce loading on the display, which could otherwise lead to deformation of the display due to forces (e.g., from air pressure) acting thereon.

Figure 1A:
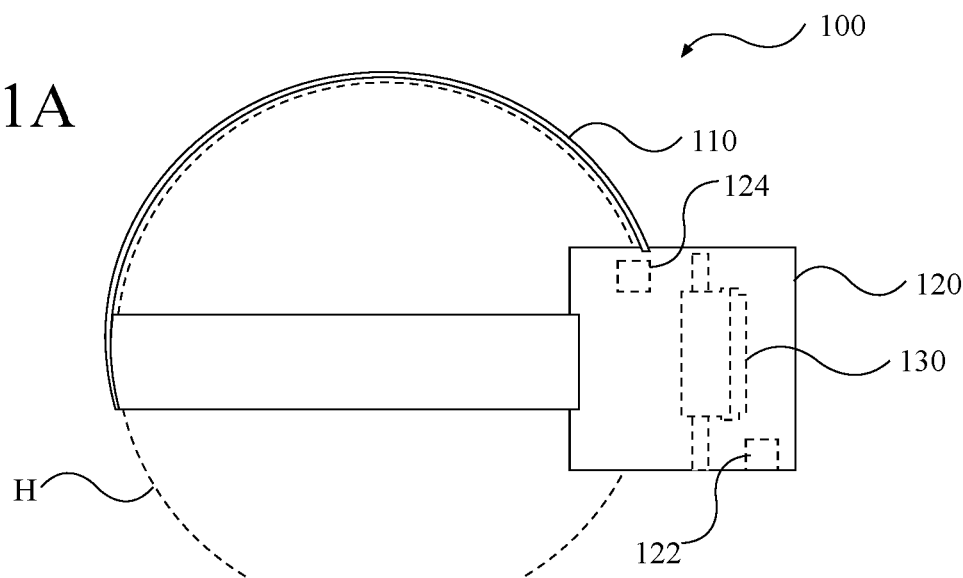
FIG. 1A is a side view of a head-mounted display of a display system having hidden components depicted in broken lines.
Figure 1B:
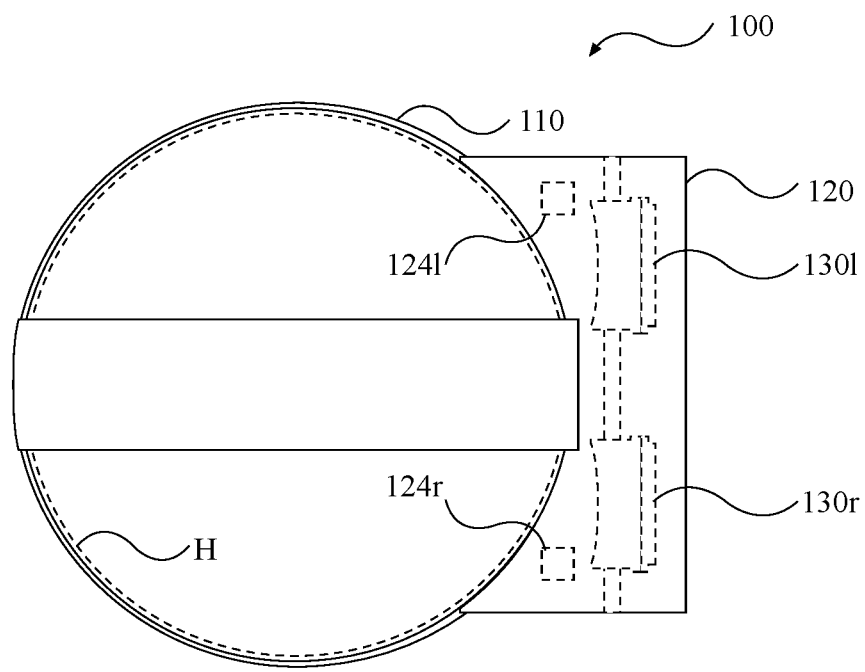
FIG. 1B is a top view of the head-mounted display of FIG. 1A.

Referring to FIGS. 1A-1B, a head-mounted display 100 (e.g., head-mountable display, or HMD) is configured to be worn on a head H of a user and display images to the user. The head-mounted display 100 may also be referred to as a display system.

The head-mounted display 100 generally includes a support system 110, a housing 120 coupled to the support system 110, and one or more optical modules 130 coupled to the housing 120. The support system 110 is configured to support the housing 120 on the head H of the user, which in turn supports the optical modules 130 in relation to the user's eyes. The optical modules 130 display images to the user. As shown, the head-mounted display 100 may include a right optical module 130r and a left optical module 130l that are to be associated with the right eye and the left eye, respectively, of the user. Alternatively, the head-mounted display 100 may include one of the optical modules 130. The optical module 130 may also be referred to as a display unit. The head-mounted display 100 may be considered as or part of a computer-generated reality system (e.g., virtual or mixed reality system).

The head-mounted display 100 is configured to display images for computer-generated reality with the optical modules 130. For example, the head-mounted display 100 may include a controller 122 and sensors 124, which are depicted schematically in FIGS. 1A and 1B. The sensors 124 may detect various parameters related to the head-mounted display 100 and/or the user. For example, the sensors 124 may measure the position, orientation, and/or changes therein of the head-mounted display 100 and, thereby, of the head H of the user. The sensors 124 may also include a right eye sensor 124r and a left eye sensor 124l that measure one or more parameters associated with the right eye and the left eye, respectively, of the user, such as gaze direction (discussed below) or focal characteristic. An example hardware configuration for the controller 122 is discussed below with respect to FIG. 6.

The controller 122, based on sensor information received from the sensors 124, sends image signals to the optical modules 130 according to which the optical modules 130 display images. For example, the sensors 124 may detect a change in orientation of the head-mounted display 100 and, thereby, the head H of the user (e.g., moving leftward), and the controller 122 sends image signals to the optical modules 130 for displaying images panning appropriately within the computer-generated reality environment (e.g., panning leftward).

Furthermore, the controller 122 may control a screen-to-lens distance of the optical modules 130 according to the sensor information. For example, the right eye sensor 124r and the left eye sensor 124l may be configured to determine gaze direction of the right eye and the left eye, respectively, of the user. The controller 122 may then correlate the gaze direction of the right eye and the left eye to features of the image (e.g., target image portions) having corresponding distances (e.g., virtual image distances). For example, the right eye sensor 124r and the left eye sensor 124l may be used to determine that the right eye and the left eye are focused on an object at a close virtual image distance (e.g., in the foreground of the images) or a far virtual image distance (e.g., in the background of the images). Based on the virtual image distance, the controller 122 may accordingly change the screen-to-lens distance of the optical module 130 (e.g., between a lens and a display screen thereof, as discussed in further detail below). Instead or additionally, the right eye sensor 124r and the left eye sensor 124l may determine focal characteristics of the eyes (e.g., a focal distance of the eye) according to which the optical module 130 may be controlled.

Instead of or in addition to the controller 122, an external controller (not shown) may be in communication with the head-mounted display 100 (e.g., with the controller 122, the sensors 124, and/or the optical modules 130). For example, the external controller may perform more computing intensive operations than the controller 122 (e.g., determining and sending image signals vs. processing sensor signals).

Figure 2A:
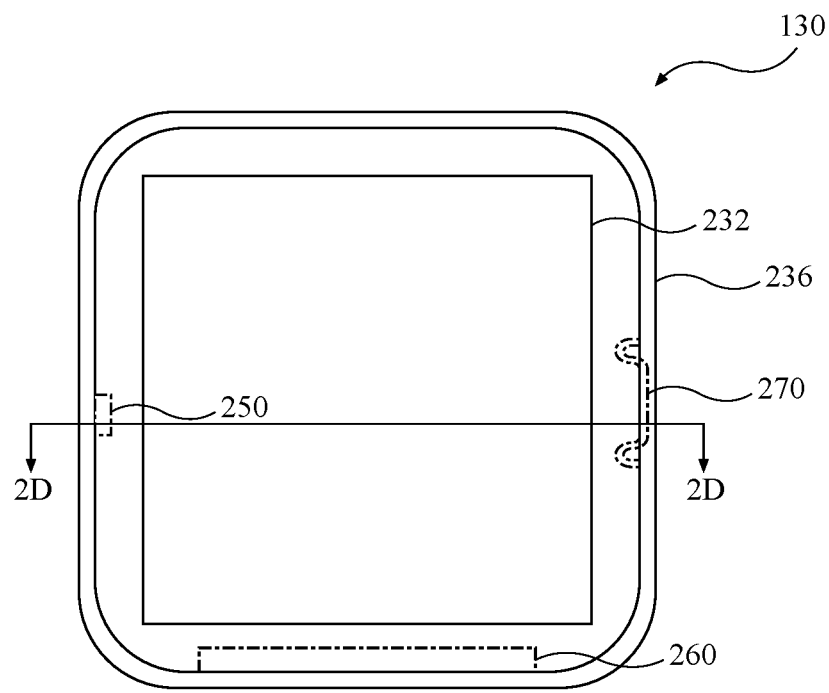
FIG. 2A is a front view of an optical module of the head-mounted display of FIG. 1A with hidden features shown in broken lines.
Figure 2B:
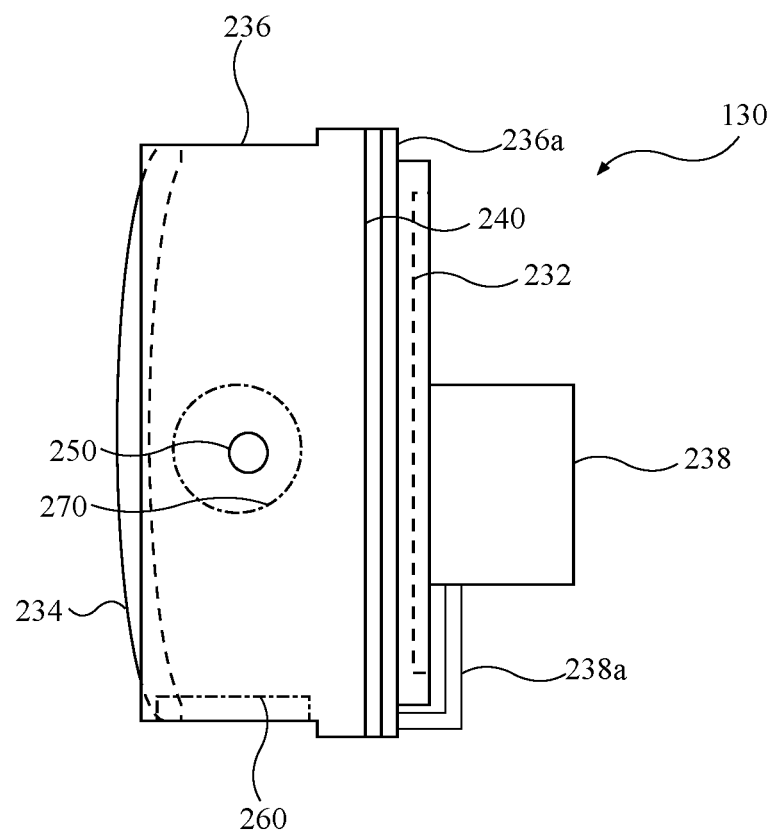
FIG. 2B is a side view of the optical module of FIG. 2A.
Figure 2C:
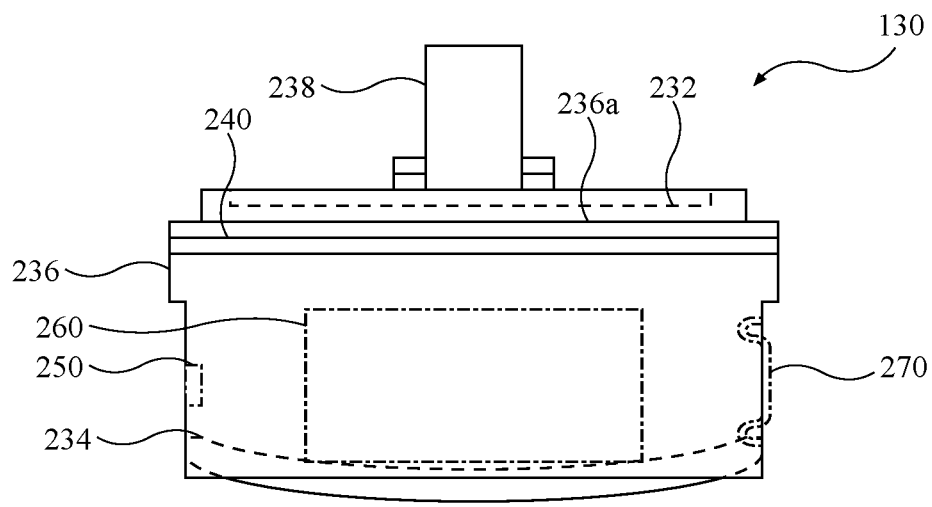
FIG. 2C is a top view of the optical module of FIG. 2A.

Referring to FIGS. 2A-2D, each of the optical modules 130 includes a display screen 232, a lens 234, a housing 236, and a movement mechanism 238 that moves the display screen 232 and the lens 234 relative to each other to change the screen-to-lens distance therebetween. For example, as the user changes their gaze direction between different portions with different virtual image distances (e.g., between foreground and background objects), the display screen 232 and the lens 234 are moved relative to each other, so as to change the screen-to-lens distance therebetween. Changing the screen-to-lens distance dynamically may provide the user with a more natural and/or realistic viewing experience as compared to having a fixed distance between the display screen 232 and the lens 234. In FIGS. 2A-2C, the display screen 232 and the lens 234 may be depicted in broken lines (equal length dashes) where hidden from view, such as by the housing 236. The optical module 130 may, for example, have a width of approximately two inches, larger than two inches, or smaller than two inches.

The display screen 232 may be any type of display capable of displaying images to the user, such as a liquid crystal display or LCD panel, or organic light-emitting diode or OLED panel. The display screen 232 receives image signals, for example, from the controller 122 and displays the images according thereto. The display screen 232 may, for example, have a mass of between 10 and 100 grams, a higher mass, or a lower mass. The display screen 232 may, for example, have a visible and/or movable area of approximately 2,000 square millimeters, a higher area, or a lower area.

The lens 234 may be any type of lens suitable for refracting light from the display screen 232 to the user's eye.

The housing 236 is coupled to the display screen 232 and the lens 234 to allow movement therebetween. For example, the housing 236 is rigidly coupled to the lens 234 to prevent movement therebetween, and is coupled to the display screen 232 in a compliant manner to allow movement therebetween. Thus, the display screen 232 is moved relative to both the housing 236 and the lens 234.

The housing 236 surrounds or circumscribes an optical axis 242 and extends axially over at least a portion of an axial distance between the display screen 232 and the lens 234. The housing 236 is coupled to the lens 234 to prevent axial movement therebetween and to form a seal therebetween. The housing 236 is coupled to the lens 234, for example, to an outer periphery of the lens 234. The housing 236 may be coupled to the lens 234 by directly engaging the lens 234 or with one or more intervening structures and/or substances (e.g., a frame or bezel associated with the lens, a gasket or seal arranged between the lens 234 and the housing 236, and/or a cured adhesive or sealant).

The housing 236 is considered rigid by generally not deflecting as the movement mechanism 238 moves the display screen 232 relative thereto. The housing 236 may, for example, be made of a molded polymer material. The housing 236 may also be referred to as a rigid housing, a rigid housing structure, a rigid surround, or a barrel.

The housing 236 is coupled to the display screen 232 with a compliant seal 240, so as to permit relative movement between the housing 236 and the display screen 232 and to form a seal therebetween. The compliant seal 240 is coupled to the housing 236, for example, by being compressed axially between an axial end face of the housing 236 and a rigid ring member 236a that is connected to the housing 236, for example, with threaded fasteners (not shown). The compliant seal 240 may be coupled to the housing 236 by additional and/or different manners, for example, with an adhesive and/or by a male-to-female interface therebetween (e.g., the compliant seal 240 receiving the housing 236 axially therein). Alternatively, the housing 236 may be rigidly coupled to the display screen 232, while the lens is coupled to the housing 236 with the compliant seal 240, so as to permit relative movement between the housing 236 and the lens 234 (e.g., by the movement mechanism 238).

Figure 2D:
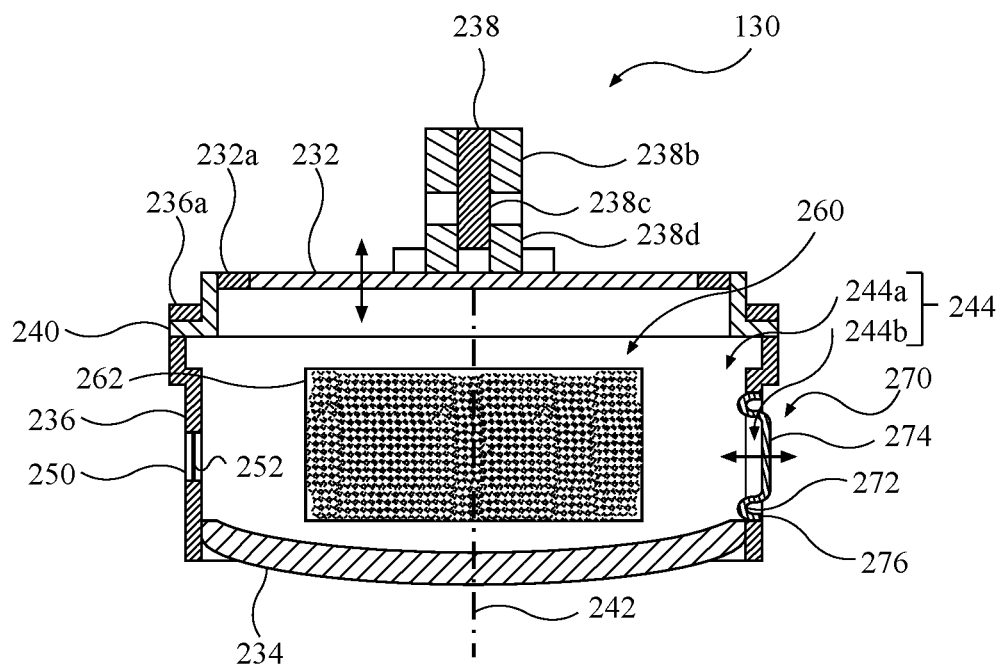
FIG. 2D is a cross-sectional view of the optical module of FIG. 2A taken from line 2D-2D in FIG. 2A.

The compliant seal 240 may generally surround the display screen 232. For example, as shown in FIG. 2D, the compliant seal 240 may be coupled to the display screen 232 with an intermediate structure 232a (e.g., a plate member) that extends radially therebetween (i.e., relative to the optical axis 242). The intermediate structure 232a is coupled to and forms a seal with both display screen 232 and the compliant seal 240 (e.g., being adhered or fastened thereto). The compliant seal 240 may be coupled to the display screen 232 in other manners, for example, by directly engaging the display screen 232 or structure thereof and/or with the use of fasteners.

The compliant seal 240 may be considered compliant by deflecting as the movement mechanism 238 moves the display screen 232 relative thereto. The compliant seal 240 may, for example, be configured as a bellows. The compliant seal 240 may, for example, be made of a rubber material. The compliant seal 240 may also be referred to as a compliant housing structure.

The movement mechanism 238 is configured to move the display screen 232 relative to the lens 234. To provide the user with a natural experience, the movement mechanism 238 may be configured to move the display screen 232, for example, having sufficient power and speed to move (e.g., accelerate) the display screen 232 at a frequency of a few Hertz (e.g., between 1 and 4 Hz), such as approximately 2.5 Hz, a higher frequency, or a lower frequency. The movement mechanism 238 may provide a range of travel, for example, of the display screen 232 of approximately +/−15 micrometers, a longer range of travel, or a shorter range of travel. For example, the movement mechanism 238 may be capable of moving the display screen across the entire range of travel (e.g., 30 micrometers) in 0.4 seconds.

The movement mechanism 238 may, for example, be a linear actuator that moves the display screen 232 axially, such as parallel with the optical axis 242. With the lens 234 being axially fixed to the housing 236, the movement mechanism 238 may be axially fixed to the housing 236, such as with a support bracket 238a, and is configured to move the display screen 232 relative to the housing 236 and, thereby, the lens 234.

In one example, referring to FIG. 2D, the movement mechanism 238 includes a motor 238b, a shaft 238c rotated by the motor 238b and axially fixed to the housing 236, and a nut 238d coupled to the display screen 232 and threadably receiving the shaft 238c. As the motor 238b rotates the shaft 238c, the nut 238d moves along the shaft 238c to thereby move the display screen 232 axially. The compliant seal 240, by being flexible and compliant, is configured to permit axial movement of the display screen 232 relative to the housing 236 and may additionally be configured to provide radial support of display screen 232 relative to the housing 236. The movement mechanism 238 may be configured in other manners, for example, by including a linkage that movably connects the display screen 232 to a motor, inclusion of a gearbox, inclusion of one or more slide rails along which the display screen moves, or other suitable type of device.

A chamber 244 is cooperatively defined by the display screen 232, the lens 234, and the housing 236. For example, relative to the optical axis 242 of the optical module 130, the chamber 244 is defined axially between the display screen 232 and the lens 234, and is defined circumferentially by the housing 236.

The chamber 244 is sealed to prevent or limit intrusion of debris and/or moisture therein, which might otherwise interfere with the user's view of the image on the display screen 232. The display screen 232 is coupled to the housing 236 to form a seal therebetween (e.g., with the compliant seal 240), and the lens 234 is coupled to the housing 236 to form another seal therebetween (e.g., with direct engagement and/or a sealing member or material), while the housing 236 extends continuously between the display screen 232 and the lens 234, or intervening members therebetween (e.g., the compliant seal 240). The term "sealed" when used in conjunction with "chamber" refers to a "chamber" that air is prevented from entering into and leaving from due to unintended mechanisms (e.g., manufacturing variability or defects, parasitic pressure changes over time, etc.). As described in further detail below, one or more vents may be provided that allow communication of air into and out of the chamber 244, while the chamber 244 may otherwise still be considered sealed.

As the display screen 232 and the lens 234 are moved relative to each other, a volume of the chamber 244 changes, which may cause changes in air pressure within the chamber 244. Such changes in pressure generate force acting on the display screen 232 and the lens 234, which may resist desired motion of the display screen 232 and the lens 234, or may lead to deformation of the display screen 232. For example, moving the display screen 232 having an area of approximately 2000 square millimeters with the movement mechanism over the range of travel of 30 micrometers at a speed of 2.5 Hz results in a 6 cubic centimeter change in volume over 0.4 seconds. This change in volume, absent pressure relieving features, would result in pressure change within the chamber 244.

The optical module 130 may include one or more pressure-relieving features, which may include one or more vents 250, an adsorbent material 260, and/or a passive radiator 270. The one or more vents 250, the adsorbent material 260, and the passive radiator 270 are considered pressure-relieving features by hindering pressure changes that might otherwise occur due to changing volume of the chamber 244. That is, but for the pressure-relieving features, the pressure would change in the chamber 244 by a larger degree. By including such pressure-relieving features, force requirements of the movement mechanism 238 may be reduced, so as to permit a smaller, lighter, and/or less-expensive movement mechanism 238 than might otherwise be required to overcome force acting between the display screen 232 and the lens 234 due to pressure changes in the chamber 244. For example, the one or more pressure relieving features may cooperatively accommodate all or a portion of such changes in volume (e.g., 6 cubic centimeters in 0.4 seconds) by passing air, adsorbing air, and/or expanding in volume. Thereby, loading of the movement mechanism 238 may be reduced to primarily account for acceleration of the display screen 232 without having to overcome air pressure changes arising therefrom. The pressure relieving features of the vent 250, the adsorbent material 260, and the passive radiator 270 may be considered passive by hindering pressure changes without controlled actuation thereof (e.g., operating from air flow).

As shown in FIGS. 2A-2D, the optical module 130 includes one each of the vent 250, the adsorbent material 260, and the passive radiator 270. In FIGS. 2A-2C, the vent 250, the adsorbent material 260, and the passive radiator 270 may be depicted in broken lines (unequal length dashes) where hidden from view, such as by the housing 236. Variations of the optical module 130 may include the vent 250, the adsorbent material 260, and/or the passive radiator 270 in different combinations. For example, contemplated variations of the optical module 130 include, but are not limited to: (a) the vent 250 with the adsorbent material 260 but not the passive radiator 270, (b) the vent 250 with the passive radiator 270 but not the adsorbent material 260, (c) the adsorbent material 260 but not the vent 250 or the passive radiator 270, (d) the passive radiator 270 but not the vent 250 or the adsorbent material 260, and (e) the adsorbent material 260 and the passive radiator 270 but not the vent 250. The vent 250, the adsorbent material 260, and the passive radiator 270 may each be provided in greater numbers (e.g., more than one).

The vent 250 in fluidic communication between an interior of the chamber 244 and an exterior of the chamber 244. As the volume of the chamber 244 changes by movement of the display screen 232, air flows through the vent 250 into and out of the chamber 244, so as to hinder changes of pressure in the chamber 244. Other than the vent 250, the chamber 244 may be sealed, such that air flows into and out of the chamber 244 substantially only through the vent 250. The vent 250 may also be referred to as a port or duct.

The exterior of the chamber 244 with which the vent 250 is in communication may be at atmospheric pressure. For example, the vent 250 may be in communication with an interior of the housing 120 of the head-mounted display 100 (e.g., communicating air directly with the interior of the housing 120) or may be in communication with an exterior of the housing 120 of the head-mounted display 100 (e.g., being in direct or indirect communication with outside the housing 120 of the HMD, such as with an intervening tube).

The vent 250 is, for example, an aperture extending through the housing 236 of the optical module 130. Alternatively, the vent 250 may be formed by the compliant seal 240, the intermediate structure 232*a*, the display screen 232 or structure associated therewith, or between components (e.g., between the lens 234 and the housing 236). While only one vent 250 is shown, the optical module 130 may include two, three, or more vents.

The vent 250 includes a filter 252, which allows passage of air, while hindering the passage of debris (e.g., dust or other particles) into the chamber 244, which might otherwise interfere with the user's view of the images on the display screen 232. The filter 252 may, for example, be configured as a woven mesh material. The filter 252 may be positioned in the vent 250 (e.g., in a passage formed by the vent) but may be located in other positions (e.g., at or over an outer surface or an inner surface of the housing 236).

The vent 250 is depicted as having a circular cross-sectional shape, but may have any other suitable shape (e.g., square, rectangular, ovoid, oblong, etc.). The vent 250 is depicted as being along a side wall of the housing 236 but may be positioned in any other suitable location, such as along one or more of a bottom wall, top wall, and an opposing side wall in addition to or instead of the side wall. The optical module 130 is depicted as having only one vent 250 but may include one or more additional vents (e.g., two, three, or more).

The vent 250 may, for example, be between 50 and 90 square millimeters, but may be provided in different sizes (e.g., larger or smaller). The provision of different sizes and/or numbers of vents 250 may, for example, depend on flow restriction provided by the filter 252, the provision of other pressure relieving features (e.g., additional vents 250, the adsorbent material 260, and the passive radiator 270), and dimensional characteristics of the optical module 130 (e.g., the volume of the chamber 244, the area of the display screen 232 that is moved, and the range of motion of the display screen 232). While a larger vent 250 may permit more air to flow into and out of the chamber 244 and, thereby, reduce the pressure changes arising from the changing volume of the chamber 244, such a larger vent 250 may also increase the possibility of debris passing into the chamber 244. It may also be advantageous to eliminate the vent 250, such that the chamber 244 is otherwise sealed.

The optical module 130 may, instead of or in addition to the vent 250, include the adsorbent material 260 and/or the passive radiator 270 in fluidic communication with the chamber 244. Different from the vent 250, the adsorbent material 260 and the passive radiator 270 hinder pressure changes in the chamber 244, while retaining air within the chamber 244. As described in further detail below, the adsorbent material 260 functions to adsorb air, while the passive radiator 270 expands and contracts to accommodate air from the chamber 244.

The adsorbent material 260 may be positioned inside the chamber 244. In one example, the adsorbent material 260 is zeolite, while in another example is active carbon. The adsorbent material may also be referred to as an adsorbent.

The adsorbent material 260 is positioned in the chamber 244, so as to not interfere with the user's view of the display screen 232, such as by being positioned below a lower edge of the display screen 232. As shown, the adsorbent material 260 may be provided as a granular material (e.g., pelletized or powdered) within a container 262. The container 264 is air permeable (e.g., air permeable container), such that air in the chamber 244 is in fluidic communication with adsorbent material 260. The container 264 may, for example, be a flexible pouch made of an air permeable flexible material (e.g., a woven fabric, perforated polymeric material, or other air permeable flexible material), or be a rigid structure made of an air permeable rigid material (e.g., perforated plastic or other air permeable rigid material). The container 264 is coupled to an interior portion of the chamber 244, such as to an interior surface of the housing 236.

The adsorbent material 260 may, for example, have a volume of approximately five cubic centimeters, but may be provided in higher or lower amounts. The provision of different amounts of the adsorbent material 260 may, for example, depend on the adsorptive characteristics of the adsorbent material 260 (e.g., adsorption rate, adsorption capacity), the provision of other pressure relieving features (e.g., additional vents 250, and the passive radiator 270), and dimensional characteristics of the optical module 130 (e.g., the volume of the chamber 244, the area of the display screen 232 that is moved, and the range of motion of the display screen 232).

Figure 3:
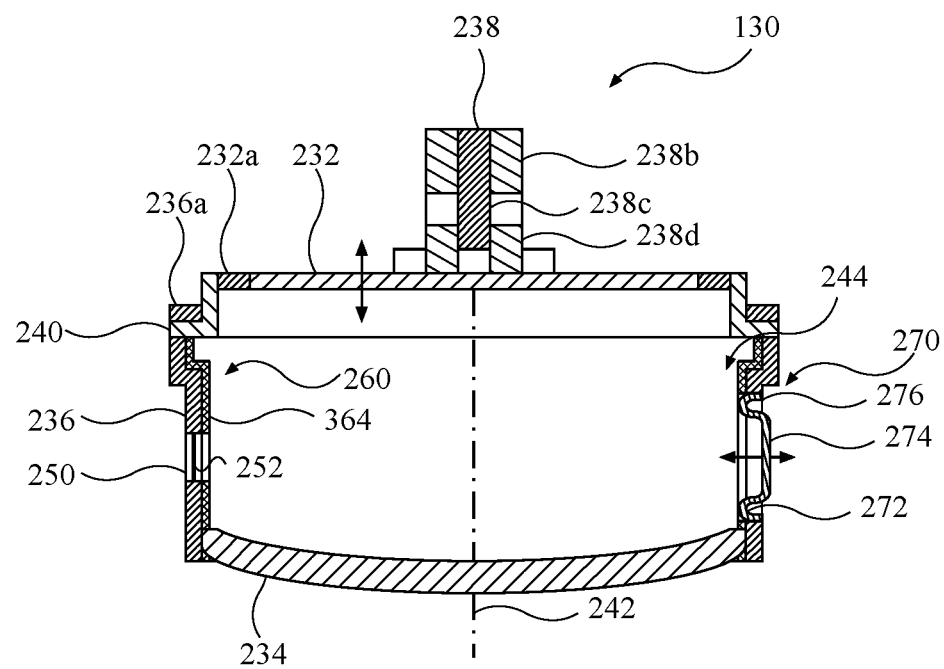
FIG. 3 is a cross-sectional view of another embodiment of the optical module.

Referring to FIG. 3, the adsorbent material 260 may instead or additionally be provided as an adsorptive coating 364. The adsorptive coating 364 includes the adsorbent material 260 therein and may be applied to an interior portion of the chamber 244 according to any suitable coating technique. For example, the adsorptive coating 364 may be applied to an interior surface of the housing 236, such as with an adhesive first applied to the housing 236 and the adsorbent material 260 subsequently being applied on top of the adhesive to remain in fluidic communication with the chamber 244.

Figure 4:
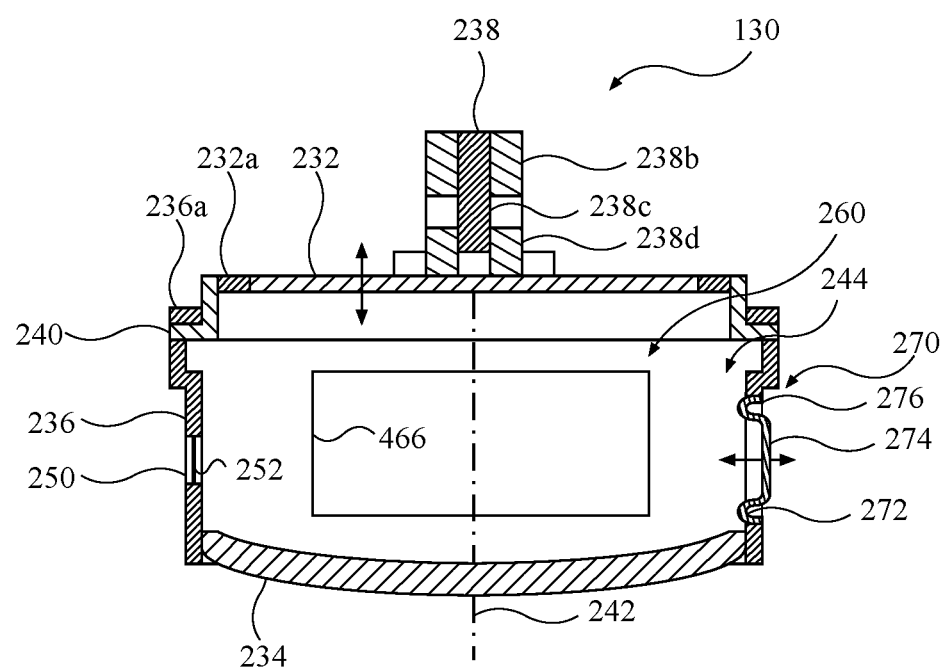
FIG. 4 is a cross-sectional view of another embodiment of the optical module.

Referring to FIG. 4, the adsorbent material 260 may instead or additionally be provided as a or within an adsorbent structure 466, such as a foam block or other structure formed by the adsorbent material 260. The adsorbent structure 466 is positioned in the chamber 244, so as to not interfere with the user's view of the display screen 232, such as by being positioned below a lower edge of the display screen 232. The adsorbent structure 466 is coupled to an interior portion of the chamber 244, such as an interior surface of the housing 236.

Referring again to FIGS. 2A-2D, the optical module 130 includes, instead of or in addition to the vent 250 and/or the adsorbent material 260, the passive radiator 270. The passive radiator 270 is a flexible diaphragm that seals the chamber 244. An interior side of the passive radiator 270 is in communication with the interior of the chamber 244, while an interior side of the passive radiator 270 is in communication with an exterior of the chamber 244, such as an interior of the housing 120 of the head-mounted display 100. The passive radiator 270 may also be referred to as a passive diaphragm.

As the display screen 232 is moved to increase or decrease the volume of the chamber 244, the passive radiator 270 moves to offset such changes in volume. For example, absent the passive radiator 270, as the display screen 232 is moved away from or toward the lens 234, the volume of the chamber 244 would increase or decrease. With the passive radiator 270, movement (e.g., deflection) of the passive radiator 270 toward or away from the interior of the chamber 244 offsets such increases and decreases in volume otherwise caused by movement of the display screen 232.

The chamber 244 may be considered to have an overall volume comprising a primary volume 244a (e.g., defined by the display screen 232, the lens 234, and the housing 236) and a secondary volume 244b defined by the passive radiator 270. As the primary volume 244a changes, as the display screen 232 and the lens 234 are moved relative to each other, the secondary volume 244b changes inversely, as the passive radiator 270 moves. For example, as the display screen 232 and the lens 234 are moved apart, the primary volume 244a increases and the secondary volume 244b decreases. That is, the passive radiator 270 decreases in volume (e.g., contracts to have a negative effective volume, for example, by protruding into the primary volume) to hinder changes to the overall volume of the chamber 244 and, thereby, hinders a pressure decrease in the chamber 244. Conversely, as the display screen 232 and the lens 234 are moved toward each other, the primary volume 244a decreases and the secondary volume 244b increases. That is, the passive radiator 270 increases in volume (e.g., expands, for example, by protruding outward from the primary volume) and, thereby, hinders a pressure increase in the primary volume 244a.

The passive radiator 270 moves in response to movement or air and/or changes of air pressure within the chamber 244 as the display screen 232 is moved. The passive radiator 270 is formed of a flexible material, such as a rubber or other polymer material. The passive radiator 270 is, for example, coupled to the housing 236, so as to seal an aperture thereof. The passive radiator 270 is less stiff than the housing 236, such that the passive radiator 270 deflects due to air movement and/or changes of pressure in the chamber 244, while the housing 236 does not deflect as a result of such air movement. The passive radiator 270 may also be less stiff, such that movement of air within the chamber 244 causes deflection of passive radiator 270, as opposed to deflection the compliant seal 240.

The passive radiator 270 may, as shown, be configured with a bellows that includes one or more corrugations 272 that extend around a periphery of the passive radiator 270. The corrugations 272 extend between an inner portion 274 (e.g., inner panel) and an outer flange 276 of the passive radiator 270. The outer flange 276 is coupled to the housing 236 to form the seal therebetween (e.g., with adhesive, mechanical fasteners, gaskets, or intervening structures).

The passive radiator 270 is additionally configured, so as to not resonate with movement of the display screen 232 by the movement mechanism 238. For example, the passive radiator 270 may have a resonant frequency that is different than (e.g., less than) that at which the movement mechanism 238 moves the display screen 232 (e.g., between 1 and 4 Hz), such as less than 1 Hz.

The passive radiator 270 is depicted as having a circular cross-sectional shape, but may have any other suitable shape (e.g., square, rectangular, ovoid, oblong, etc.). The passive radiator 270 is depicted as being along a side wall of the housing 236 but may be positioned in any other suitable location, such as along one or more of a bottom wall, top wall, and an opposing side wall in addition to or instead of the side wall. The optical module 130 is depicted as having only one passive radiator 270 but may include one or more additional passive radiators (e.g., two, three, or more).

Figure 5:
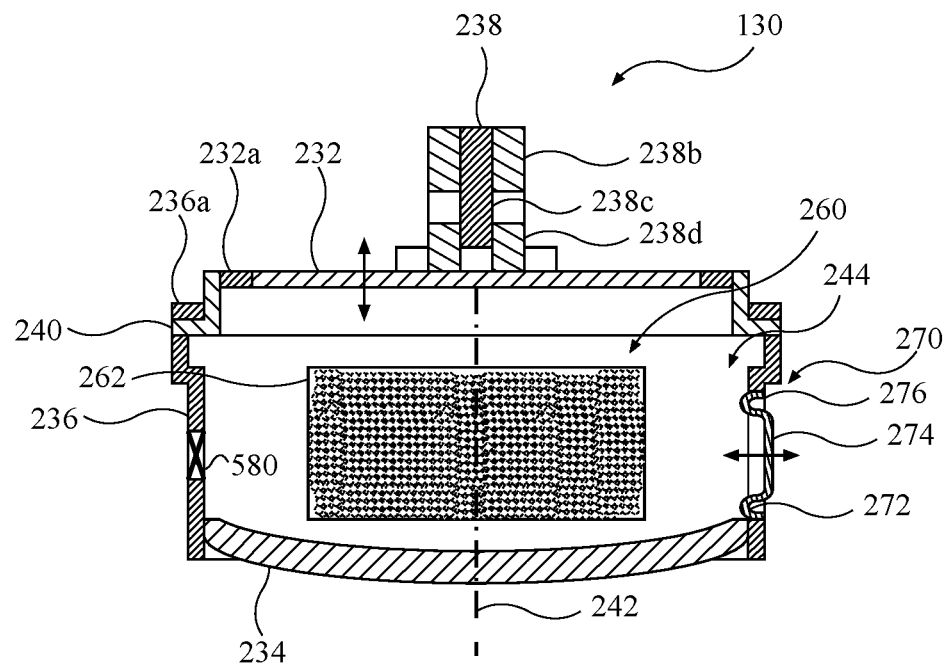
FIG. 5 is a cross-sectional view of another embodiment of the optical module.

Referring to FIG. 5, the optical module 130 may also include one or more valves 580 (depicted schematically). The valve 580 controls the flow of air into and out of the chamber 244, for example, to account for pressure changes due to environmental changes, such as those occurring from significant changes in elevation (e.g., when traveling between coastal and mountainous regions) or other environments (e.g., when traveling in an airplane). The valve 580 may be an active valve that is selectively controlled (e.g., by the controller 122), for example, by being briefly opened when turning on or otherwise enabling the head-mounted display 100. Alternatively, the valve 580 may be passive in which case air passes therethrough upon a pressure differential between an interior and an exterior of the chamber 244. The chamber 244 of optical module 130 having the valve 580 may be sealed, as defined above, other than the valve 580 that selectively permits air to flow into and out of the chamber 244. As illustrated, the valve 580 may be used in conjunction with the adsorbent material 260 and the passive radiator 270 but is not used in conjunction with a permanent opening to atmosphere (e.g., such as the vent 250).

Figure 6:
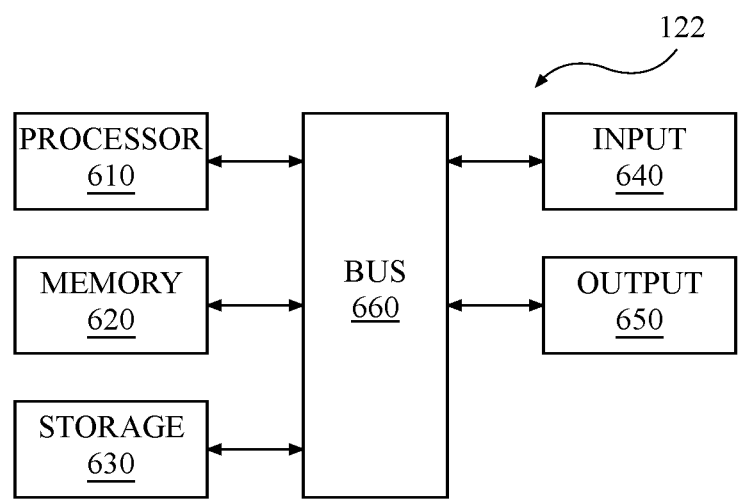
FIG. 6 is a schematic view of a controller of the head-mounted display of FIG. 1A.

Referring to FIG. 6, an example hardware configuration of the controller 122 is described. The controller 122 may include a processor 610, a memory 620, a storage device 630, one or more input devices 640, and one or more output devices 650. The controller 122 may include a bus 660 or a similar device to interconnect the components for communication. The processor 610 is operable to execute computer program instructions and perform operations described by the computer program instructions. As an example, the processor 610 may be a conventional device such as a central processing unit. The memory 620 may be a volatile, high-speed, short-term information storage device such as a random-access memory module. The storage device 630 may be a non-volatile information storage device such as a hard drive or a solid-state drive. The input devices 640 may include any type of human-machine interface such as buttons, switches, a touchscreen input device, a gestural input device, an audio input, and/or sensor input devices (e.g., sensors 124). The output devices 650 may include any type of device operable by the controller 122, such as the optical module 130 (e.g., the display screen 232 and/or the movement mechanism 238 thereof).

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources to display content, which may include varying content based on movement of the head or eyes of the user and/or moving the display screen and the lens relative to each other. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to display content, which may include moving the display screen and the lens relative to each other to provide an enhanced user experience. Accordingly, use of such personal information data enables users an enhanced user experience. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of observing movements of the head or eyes of the user, the present technology can be configured to allow users to select to "opt in" or "opt out" of participation in the collection of personal information data during registration for services or anytime thereafter. In another example, users can select not to provide user movement data or can select to limit the length of time user observation data is observed or maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be displayed to users by inferring preferences based on non-personal information data or a bare minimum amount of personal information, such as the content being requested by the device associated with a user, or publicly available information.

What is claimed is:

1. An optical module for a display system comprising:
a lens;
a display screen that cooperatively defines a chamber with the lens;
a movement mechanism by which the lens and the display screen are moved relative to each other; and
one or more pressure-relieving features in fluid communication with the chamber to hinder pressure changes in the chamber as the lens and the display screen are moved relative to each other.

2. The optical module of claim 1, further comprising a housing coupled to the lens and the display screen and cooperatively defining the chamber with the display screen and the lens, wherein one of the lens or the display screen is rigidly coupled to the housing and the other of the lens or the display screen is coupled to the housing with a compliant seal;
wherein the one or more pressure-relieving features include zeolite that is contained in an air permeable container located inside the chamber so as to not hinder a view of the display screen through the lens; and
wherein the one or more pressure-relieving features further include a passive radiator that is a flexible diaphragm that seals an aperture in the housing.

3. The optical module of claim 1, wherein the one or more pressure-relieving features retain air inside the chamber.

4. The optical module of claim 1, wherein the one or more pressure-relieving features include an adsorbent.

5. The optical module of claim 4, wherein the adsorbent is zeolite.

6. The optical module of claim 4, wherein the adsorbent is positioned in the chamber.

7. The optical module of claim 6, wherein the adsorbent is a granular material contained in an air permeable container inside the chamber.

8. The optical module of claim 1, wherein the one or more pressure-relieving features include a passive radiator that retains air inside the chamber.

9. The optical module of claim 8, further comprising a housing coupled to the lens and the display screen and cooperatively defining the chamber with the display screen and the lens, wherein the passive radiator is coupled to the housing.

10. The optical module of claim 9, wherein the housing includes an aperture and the passive radiator seals the aperture.

11. The optical module of claim 8, wherein the passive radiator includes a flexible diaphragm.

12. The optical module of claim 8, wherein the passive radiator has a resonant frequency that is less than a frequency at which the movement mechanism moves the display screen and the lens relative to each other.

13. The optical module of claim 1, further comprising a vent having a filter and allowing passage of air between an interior of the chamber and an exterior of the chamber.

14. The optical module of claim 1, wherein the one or more pressure-relieving features hinders the pressure changes in the chamber that would, but for the pressure-relieving feature, be greater from changing a volume of the chamber when the lens and the display screen are moved relative to each other.

15. A head-mounted display comprising:
a housing;
a support coupled to the housing for supporting the housing on a head of a user;
a sensor for measuring a parameter of an eye of the user;
an optical module coupled to the housing, the optical module comprising:
a lens;
a display screen that cooperatively defines a chamber with the lens;
a movement mechanism by which the lens and the display screen are moved relative to each other according to the parameter; and
one or more of an adsorbent material or a passive radiator in fluid communication with the chamber to hinder pressure changes in the chamber as the lens and the display screen are moved relative to each other.

16. The head-mounted display of claim 15, comprising a vent in fluid communication with the chamber for communicating air into and out of the chamber.

17. The head-mounted display of claim 16, comprising the passive radiator that retains air inside the chamber.

18. The head-mounted display of claim 15, comprising the passive radiator that retains air inside the chamber.

19. The head-mounted display of claim 15, wherein the optical module further includes a compliant housing structure that seals the chamber, surrounds an optical axis of the optical module, and permits the lens and the display screen to move relative to each other.

20. The head-mounted display of claim 15, wherein the one or more of the adsorbent material or the passive radiator is a pressure-relieving feature that hinders the pressure changes in the chamber that would, but for the pressure-relieving feature, be greater from changing a volume of the chamber when the lens and the display screen are moved relative to each other.

21. An optical module for a head-mounted display comprising:
a lens;
a display screen, wherein the lens and the display screen cooperatively define a chamber;
a housing that cooperatively defines the chamber with the lens and the display screen, and a compliant seal that seals the chamber and permits the lens and the display screen to move relative to each other; and
a passive pressure-relieving feature that hinders pressure changes in the chamber.

22. The optical module of claim 21, wherein the passive pressure-relieving feature is zeolite that adsorbs air as the chamber decreases in size.

23. The optical module of claim 21, wherein the passive pressure-relieving feature is a passive radiator expands as the chamber decreases in size, the passive radiator retaining air inside the chamber.

24. The optical module of claim 21, wherein the housing is coupled to one of the lens or the display screen, and the compliant seal is coupled to the housing and the other of the lens or the display screen.

25. The optical module of claim 21, wherein the seal circumscribes an optical axis of the optical module.

26. The optical module of claim 21, wherein the display screen and the lens are movable relative to each other to change a volume of the chamber.

* * * * *

UNITED STATES PATENT AND TRADEMARK OFFICE
CERTIFICATE OF CORRECTION

Page 1 of 1

PATENT NO. : 11,092,809 B2
APPLICATION NO. : 16/144297
DATED : August 17, 2021
INVENTOR(S) : Neal D. Evans et al.

It is certified that error appears in the above-identified patent and that said Letters Patent is hereby corrected as shown below:

In the Claims

Column 16, Claim 23, Line 52, "radiator expands as" should be --radiator that expands as--.

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*